INVENTOR
RUSSELL A. HETZER
BY
Brockett, Hyde, Higley & Mayer
ATTORNEYS

Oct. 8, 1940.  R. A. HETZER  2,217,340
TRANSMISSION MECHANISM
Original Filed April 29, 1936  4 Sheets-Sheet 2
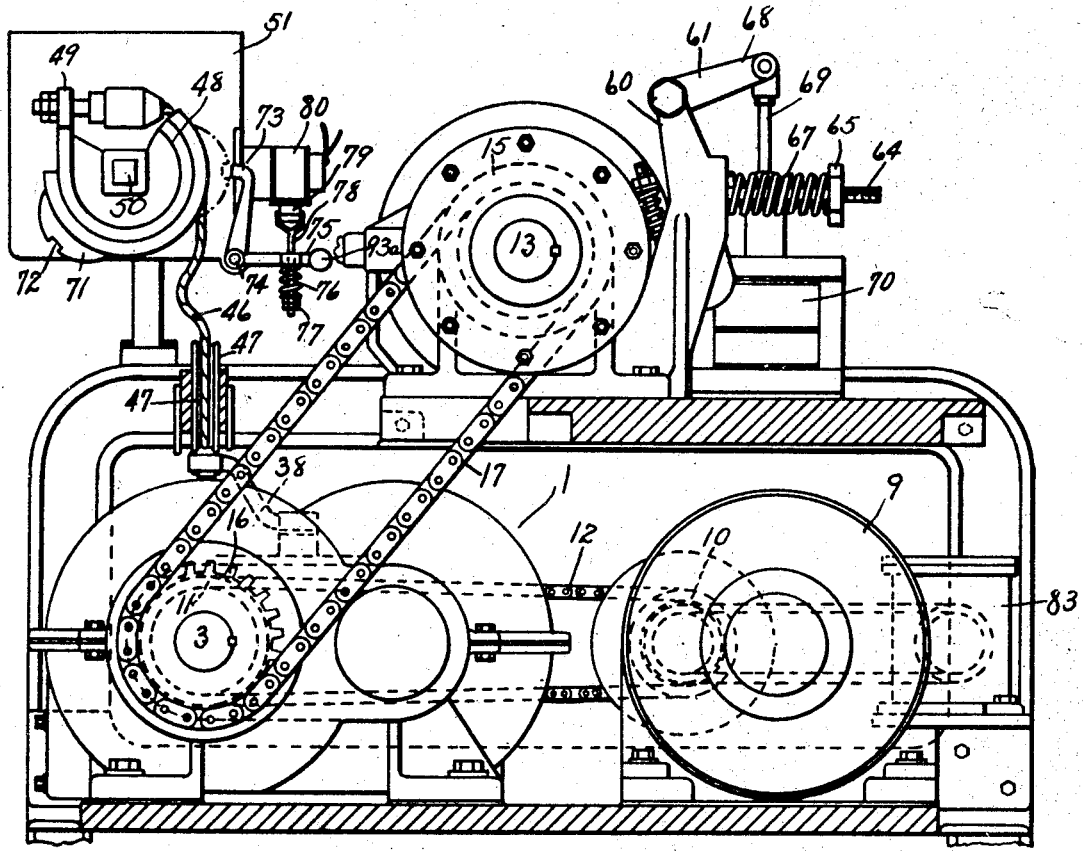
FIG.- 2
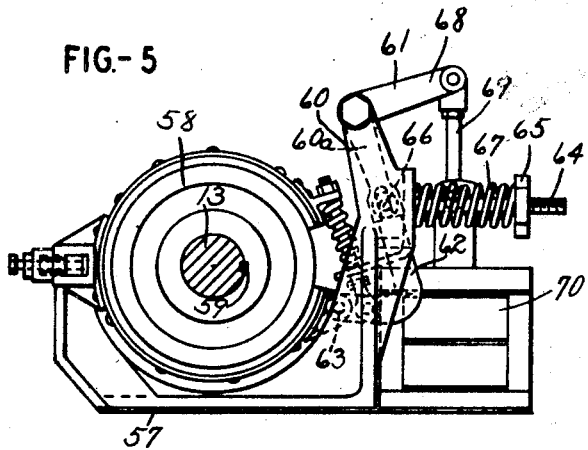
FIG.- 5
FIG.- 6
INVENTOR
RUSSELL A. HETZER
BY
ATTORNEYS Oct. 8, 1940.                R. A. HETZER                 2,217,340
                         TRANSMISSION MECHANISM
          Original Filed April 29, 1936     4 Sheets-Sheet 3
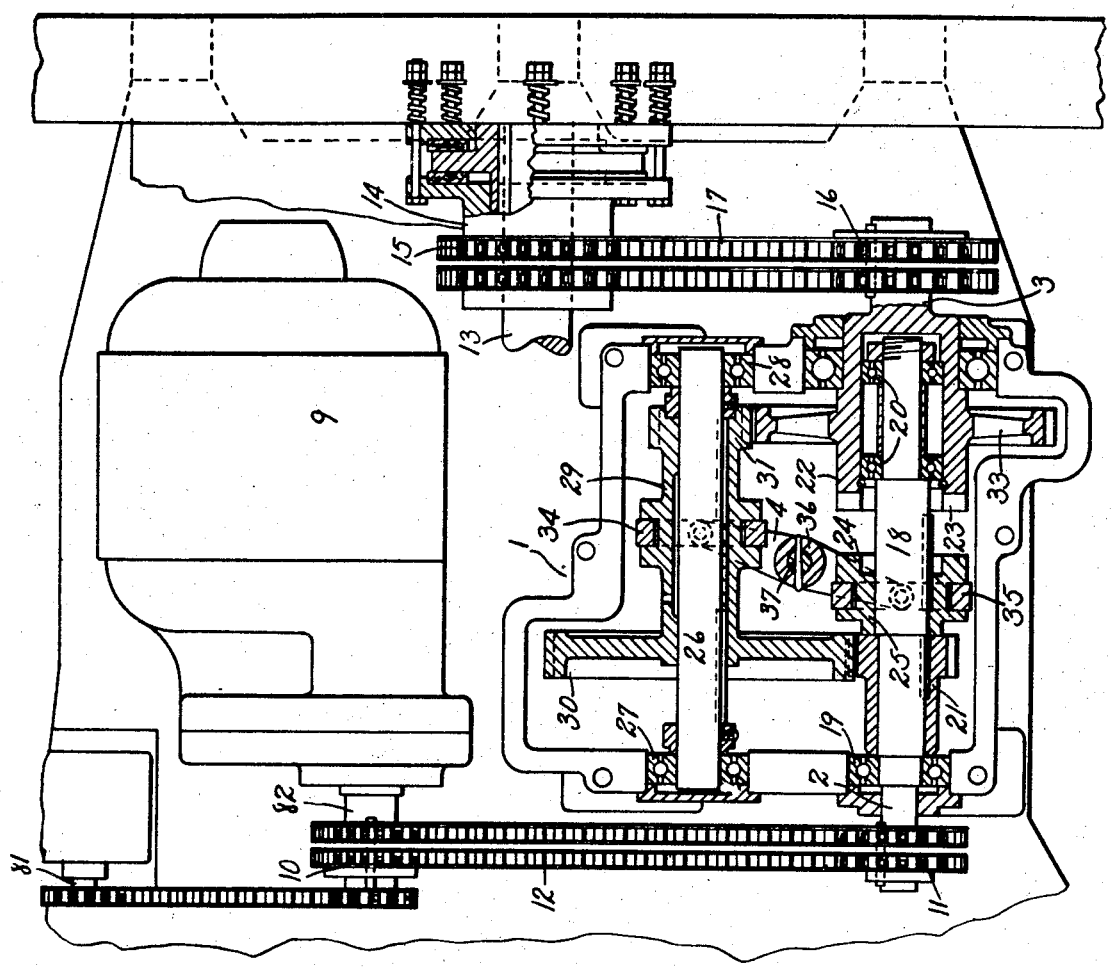
INVENTOR
RUSSELL A. HETZER
BY
Brockett, Hyde, Hegley + Mager
ATTORNEYS

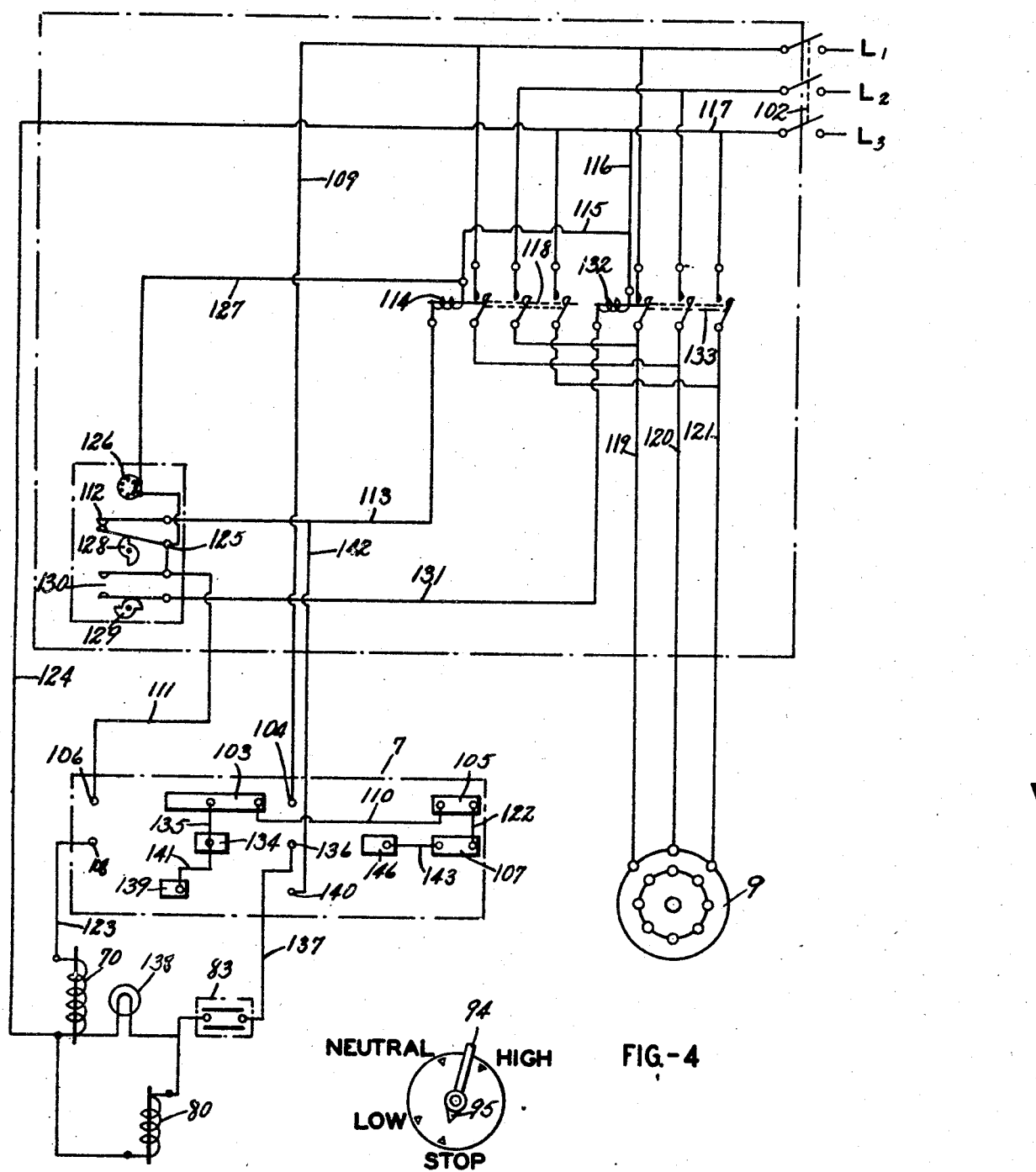

Patented Oct. 8, 1940

2,217,340

UNITED STATES PATENT OFFICE 2,217,340

TRANSMISSION MECHANISM

Russell A. Hetzer, Cincinnati, Ohio, assignor to The American Laundry Machinery Company, Norwood, Ohio, a corporation of Ohio Original application April 29, 1936, Serial No. 76,930. Divided and this application December 6, 1937, Serial No. 178,255

1 Claim. (Cl. 74—333)

My invention relates to mechanism for initiating and transmitting power from a source of energy to an output element. More particularly it relates to an improved mechanism and a control device therefor for transmitting power from a source of energy, such as an electric motor, to a rotatable shaft and is a division of my application Serial No. 76,930, filed April 29, 1936.

In various operations, such as fabric cleaning apparatus it is desirable to transmit energy from a suitable source of power to drive a shaft connected to the rotatable work container at low speed, with periodic reversals thereof, to wash or clean the fabric, or unidirectionally at high speed to extract the cleaning solvent or liquid from the fabric. I do not desire to be limited in this respect, however, as my invention may be utilized for transmitting power for any desired purpose.

It is the aim of the present invention to provide an improved transmission mechanism and a movable control device therefor which is associated with a source of power and the transmission in such a manner that the moving and setting of the control device automatically effects proper shifting and meshing of the gears in the transmission and provides energy to the source of power to drive the output element at the desired speed, either unidirectionally at high or low speed or at low speed with periodic reversals.

Another object of my invention is to provide an improved transmission mechanism and a control device associated therewith and with a source of power in such a manner that when the control device is set in different predetermined positions, the gears and a clutch in the transmission are automatically shifted and power is supplied to operate an input element.

My invention will be better understood by reference to the accompanying drawings, in which—

Fig. 2 is a rear elevational view on the line 2—2 of Fig. 1;

Fig. 3 is a plan view of the motor, connecting gears and zero speed switch, the cover of the transmission being removed and the transmission assembly being shown in cross section;

Fig. 4 is a diagrammatic view of the control drum and an electric circuit for supplying current to the motor, solenoids, switches and brake when the control device is in various positions;

Fig. 5 is a side elevational view of the brake on the line 5—5 of Fig. 1;

Fig. 6 is a cross sectional view of the control drum on the line 6—6 of Fig. 1;

Fig. 7 is a plan view of the zero speed control switch, the cover being removed; and Fig. 8 is a cross section on the line 8—8 of Fig. 7.

Figure 1:
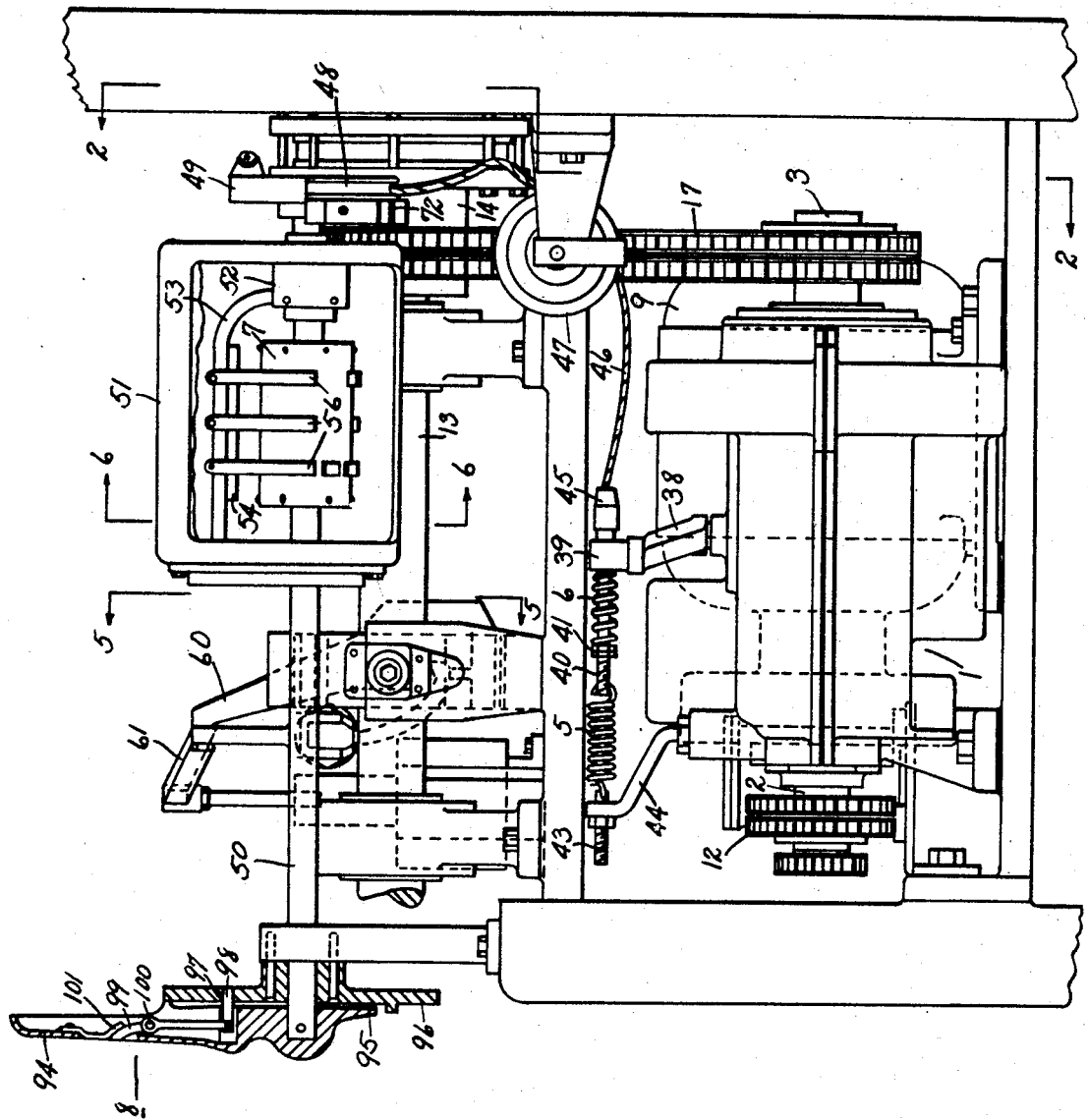
Fig. 1 is an elevational view of my improved mechanism showing parts in section.

My improved mechanism as shown in the drawings includes a transmission 1 having an input element 2, an output element 3 and a shifting member 4, two resilient members 5 and 6, a movable control device 7 and a handle 8. As illustrated, power is supplied to the input element 2 from any suitable source, such as a motor 9 provided with a gear 10 which is connected to a gear 11 on the input element by means of a chain 12. The output element 3 may be connected to any suitable member to be driven, such as a shaft 13 which may be connected to the output element by means of a friction coupling 14 provided with a gear 15 which is connected to the gear 16 of the output element by means of a chain 17.

The transmission is arranged to provide high speed unidirectional rotation of the output element when the control device is in one position and low speed operation of the output element either unidirectionally or with periodic reversals when the control device is in a second position.

As illustrated, the transmission includes a main drive shaft 18 which as shown, is a continuation of the input element 2 and is supported upon suitable bearings 19 and 20. The main drive shaft is provided with a fixed pinion 21 and rotatably mounted upon the bearing 20 is a hub 22, one end of which is a continuation of the output element 3 and the other end of which is provided with jaws 23 which are adapted to mesh with jaws 24 of a clutch 25 which is slidably mounted on shaft 18 when clutch 25 is moved to the right as shown in Fig. 3 of the drawings. When the jaws on clutch 25 are in mesh with the jaws 23 of the output element, power supplied to input element 2 is transmitted directly through shaft 18 to provide high speed transmission. To provide low speed transmission, a countershaft 26 is supported in suitable bearings 27 and 28 in the transmission casing on which is slidably mounted a hub 29 having a gear 30 at one end which is adapted to mesh with pinion 21 and a pinion 31 at the other end which is adapted to mesh with a gear 33 on hub 22.

For the purpose of simultaneously shifting hub 29 and the clutch 25 to provide low or high speed transmission or to throw the transmission into neutral, shifting member 4 is connected at one end to a ring 34 which fits in a recess in hub 29 and at the other end to a ring 35 which fits in a recess in clutch 25. As shown in the drawings, the gears are in mesh and power supplied to input element 2 is transmitted through pinion 21, gear 30, hub 29, pinion 31 and gear 33 to output element 3. When shifting member 4 is moved in a counterclockwise direction, hub 29 is shifted to the left and clutch 25 is shifted to the right as shown in Fig. 3 of the drawings and the transmission is in neutral. Upon further movement of the shifting member 4 in a counterclockwise direction, the jaws of clutch 24 are shifted into engagement with the jaws of hub 22 to provide high speed transmission.

In accordance with my improved invention, the gears and clutch are shifted in response to the movement of the control device 7. While any desired mechanism may be provided for this purpose, as shown in the drawings shifting member 4 is provided with a vertical tubular member 36 which is pinned to a vertical shaft 37 rotatably mounted in the bottom of the transmission casing and extending through an aperture in the upper portion of the casing as illustrated in Fig. 1 of the drawings. A lever 38 extending outside the casing is secured to the shaft 37 and is provided with an apertured block 39 through which a rod 40 extends. The rod 40 is provided with a nut 41 forming a seat for compression spring 6 and is connected at one end to the tension spring 5, the other end of the tension spring 5 being connected to a rod 43 threaded in an apertured bracket 44 supported upon the casing of the transmission. The opposite end of rod 40 is attached to a coupling 45 to which a flexible member 46 is secured. The flexible member 46 passes around a guide 47 attached to the frame, a pulley 48 secured to shaft 50 of control device 7, and is attached at its opposite end to a bracket 49 on pulley 48.

When the transmission is in neutral position and control device 7 is in the position shown in the drawings, resilient member 5 is under sufficient tensional stress to force gear 30 in mesh with pinion 21 when they are in meshing relationship or to force gear 30 into engagement with pinion 21 and provide sufficient additional tensional stress to move gear 30 into mesh with pinion 21 upon movement of the input element. Upon movement of the control device 7 in a clockwise direction looking from the left in Fig. 1 of the drawings, flexible member 46 is tightened, nut 41 engaging compression spring 6 forces lever 38 to the right as shown in Fig. 1 of the drawings which moves shifting member 4 in an anticlockwise direction as shown in Fig. 3 and hub 29 is shifted to the left and the clutch 25 is shifted to the right as shown in Fig. 3. The transmission is then in neutral position. Upon further movement of control device 7 in a clockwise direction, jaw 24 of clutch 25 is forced into meshing engagement with the jaws of hub 22 if the jaws are in meshing relationship. If the jaws engage jaw to jaw, however, they are forced into engagement with each other and resilient member 6 is under sufficient compression to move the jaws into mesh upon movement of the input element.

Means are also provided to supply power to the input element when the control device is in the proper position to provide transmission. While any desired source of power may be employed to operate the input element, as illustrated in the drawings, an electric motor is utilized and when the control device is in various positions, certain circuits are established which supply current to the motor. For this purpose the control device 7 is supported in a housing 51 provided with a bracket 52 from which a support 53 extends, the lower portion of which is provided with an insulating strip 54 as shown in Fig. 6 to which inlet leads 55 and outlet leads 56 are attached. Secured to the control device is a series of electrically conducting segments connected together by electrical conductors so that upon movement of the control device to predetermined positions, circuits are established to supply current to the motor during low and high speed transmission.

Upon movement of the control device to a position which shifts the transmission into neutral, a brake is automatically applied to driven shaft 13. As illustrated in Fig. 5, the braking mechanism is supported upon a frame 57 and comprises a drum 58 which is keyed to driven shaft 13 as indicated by the numeral 59. A bracket 60 extends upwardly from the drum frame to which a bellcrank 61 is pivotally attached, one arm of which is pivotally attached to a lever 62, thereby forming a toggle link, the opposite end of lever 62 being pivotally attached to one end of the brake band at the point 63. To hold the brake band in operative position a rod 64 provided with an adjustable nut 65 is secured to the pivot pin 66 which connects bellcrank 61 to lever 62. Interposed between the nut 65 and bracket 60 is a spring 67 which normally forces the arm 60a of bellcrank 61 and the upper arm of lever 62 outwardly, thus holding the brake in operative engagement with the shaft. Pivotally attached to the arm 68 of bellcrank 61 is an armature 69 which is forced downwardly by means of a solenoid 70 to release the braking mechanism. When the control device is in a position to provide low or high speed transmission, electric current is supplied to energize solenoid 70 and the brake is released. When the transmission is in neutral position, however, solenoid 70 is deenergized and the braking mechanism is held in operative position by means of the spring 67.

Means are also provided to prevent movement of the control device from a position which provides low speed transmission to a position which provides high speed transmission, or in a reverse direction, until the motor 9 comes to rest. For this purpose pulley 48 is provided with a lug 71 having a recess 72, and when the control drum is in neutral position, a key 73 pivotally supported at 74 and having an apertured arm 75 is held in recess 72 by means of a spring 76 interposed between the arm 75 and a nut 77 threaded upon a rod 78 which extends through the aperture in arm 75 and is connected to the armature 79 of a solenoid 80.

The solenoid 80 is energized by means of current which passes through a zero speed switch. The zero speed switch, as illustrated more particularly in Figs. 7 and 8 of the drawings, is provided with a shaft 81 which is connected to the shaft 82 of motor 9. The switch is enclosed in a casing 83 and includes a disk 84 which is pinned to shaft 81, a disk 85 which is rotatably mounted upon the shaft and a bracket 86 formed of insulating material which carries two sets of electrical contacts 87 and 88. Supported upon disk 85 is an arm 89 which is secured to disk 85 by any suitable means, such as screws and which is provided with extensions forming anchors for a pair of springs 90 and 91. When shaft 81 is rotated, the friction between the disks 84 and 85 moves electrical contacts 92 secured to one side of arm 89 into engagement with electrical contacts 87 secured to one end of bracket 86 or electrical contacts 93 secured to the opposite side of arm 89 into engagement with electrical contacts 88 secured to the other end of bracket 86 in accordance with the direction of rotation of shaft 81, thereby establishing a circuit from the control device to solenoid 80. When the motor comes to rest, however, spring 90 or spring 91 breaks the circuit, solenoid 80 is deenergized, and a weight 93a removes latch or key 73 from recess 72 and the control device may be moved to a different position.

Convenient means are provided for operating the control device from a central point to shift the gears and provide energy to the input element, brake and solenoid. As shown in the drawings, a lever 94 is attached to the shaft 50 of the control device which is provided with a pointer 95 adapted to move over a dial 96 at different points upon which are symbols indicating the various positions of the transmission and which is provided with apertures 97 which are adapted to receive a stud 98 attached to one end of a lever 99 which is pivotally mounted at a point 100 on the main lever 94. A spring 101 normally maintains the stud 98 in one of the apertures 97. When pressure is applied to the opposite end of lever 99, however, stud 98 is withdrawn from the aperture and lever 94 may be moved to the desired position at which time the spring 101 forces the stud 98 into a different aperture.

The operation of my improved mechanism will become apparent from a description of the control device and circuits shown in Fig. 4 of the drawings. As illustrated, the control device is in the stop position and all circuits are open. When switch 102 is closed and lever 94 is moved so that pointer 95 is at the low position, control device 7 is moved to the right as shown in Fig. 4, and segment 103 on the control device is moved into engagement with terminal 104, segment 105 is moved into engagement with terminal 106 and segment 107 is moved into engagement with terminal 108. A circuit is thus established from line L₁ through conductor 109, terminal 104, segment 103, conductor 110, segment 105, terminal 106, conductor 111, switch 112, conductor 113, coil 114 and conductors 115, 116 and 117 to line L₃. The energization of coil 114 closes switch 118 and current to the motor is supplied through conductors 119, 120 and 121 from lines L₂, L₁ and L₃. When the control device is in this position the transmission is in the position shown in Fig. 3, or if the teeth of gear 30 and pinion 21, or the teeth of pinion 31 and gear 33 engage tooth to tooth, there is sufficient tension in spring 5 to force them into mesh when energy is supplied to input element 2. Shaft 13 is therefore driven unidirectionally at low speed.

A circuit is also established from line L₁ through conductor 109, terminal 104, segment 103, conductor 110, segment 105, conductor 122, segment 107, terminal 108, conductor 123, solenoid 70 and conductors 124 and 117 to line L₃ which energizes solenoid 70 and releases the brake. When it is desired to drive shaft 13 in alternately reverse directions, a circuit is also established from terminal 125 to motor 126, and conductors 127, 115, 116 and 117 to line L₃. Motor 126 drives a cam shaft provided with cams 128 and 129 which alternately close switch 112 and switch 130. These switches may be normally maintained in open position by any suitable means, such as springs, not shown.

As illustrated in Fig. 4 of the drawings, switch 112 is closed and switch 130 is open. When switch 130 is closed and switch 112 is open the current passes through switch 130, conductor 131, coil 132 and conductors 116 and 117 to line L₃. Coil 132 is therefore energized which closes switch 133 and current is supplied to the motor 9 through conductors 119, 120 and 121 from lines L₁, L₂ and L₃ and consequently the motor 9 is operated in the reverse direction.

When it is desired to throw the transmission into neutral, the control device 7 is moved in a clockwise direction as viewed from the left in Fig. 1 of the drawings. The movement of the control device compresses spring 6, lever 38 is moved to the right as shown in Fig. 1 and shifting member 4 is moved in an anti-clockwise direction as shown in Fig. 3 shifting the gears out of mesh and shifting clutch 25 a short distance to the right. When the control device is in this position, segment 103 is in engagement with terminal 104 and segment 134 is moved into engagement with terminal 136. A circuit is therefore established from line L₁ through conductor 109, terminal 104, segment 103, conductor 135, segment 134, terminal 136, conductor 137, zero speed switch 83, solenoid 80 and conductors 124 and 117 to line L₃. The energization of solenoid 80 raises armature 79 and forces latch 73 into recess 72, thereby preventing the operation of lever 94 until the driving parts come to complete rest. A circuit is also established through a light 138 which is illuminated while the motor 9 is running. During this period the brake solenoid 70 is deenergized and the brake is applied.

After motor 9 comes to a complete rest, high speed transmission may be provided. For this purpose lever 94 is rotated in a clockwise direction as shown in Fig. 4 until the pointer 95 on lever 94 points to the high position which moves control device 7 further in a clockwise direction as viewed from the left in Fig. 1 and shifting member 4 moves jaws 24 of clutch 25 into engagement with the jaws 23 of hub 22. Resilient spring 6 is compressed sufficiently by this movement of the control device to force jaws 24 into engagement with jaws 23 and retains sufficient compressive stress if the jaws engage jaw to jaw to force them into meshing relationship upon movement of input element 2. When the clutch is engaged, transmission is directly from the input element 2 to the output element 3 through the shaft 18. When the control device is in this position segment 139 engages terminal 140, segment 146 engages terminal 108 and segment 103 is still in engagement with terminal 104. A circuit is therefore established from line L₁ through conductor 109, terminal 104, segment 103, conductor 135, segment 134, conductor 141, segment 139, terminal 140 and conductors 142, 113, coil 114 and conductors 115, 116 and 117 to line L₃. The energization of coil 114 closes switch 118 and current is supplied to motor 9 to operate the input element. It will be noted that when the control device is in this position no current is supplied to motor 126 and the output element is rotated unidirectionally.

A circuit is also established from line L₁ through conductor 109, terminal 104, segment 103, conductor 110, segment 105, conductor 122, segment 107, conductor 143, segment 146, terminal 108, conductor 123, solenoid 70 and conductors 124 and 117 to line L₃. The solenoid controlling the brake is therefore energized and the brake is released.

What I claim is:

Apparatus of the class described, including a transmission having an input element and an output element, means for driving said input element, a movable control device adapted to be set in different positions, a shiftable device having a part which is adapted to engage a part on the input element when the shiftable device is moved in one direction from a neutral position and a part which is adapted to engage a part on the output element when the shiftable device is moved in the opposite direction, resilient means associated with the shiftable device and the control device which is under sufficient stress to force a part of the shiftable device into engagement with a part of the input element when the control device is set in one position and other resilient means which is under sufficient stress to force a part of a shiftable device into engagement with a part on said output element when the control device is set in a second position, said first named resilient means being under greater stress when the control device is in the second position than when the control device is in the first position.

RUSSELL A. HETZER.